United States Patent Office 3,420,638
Patented Jan. 7, 1969

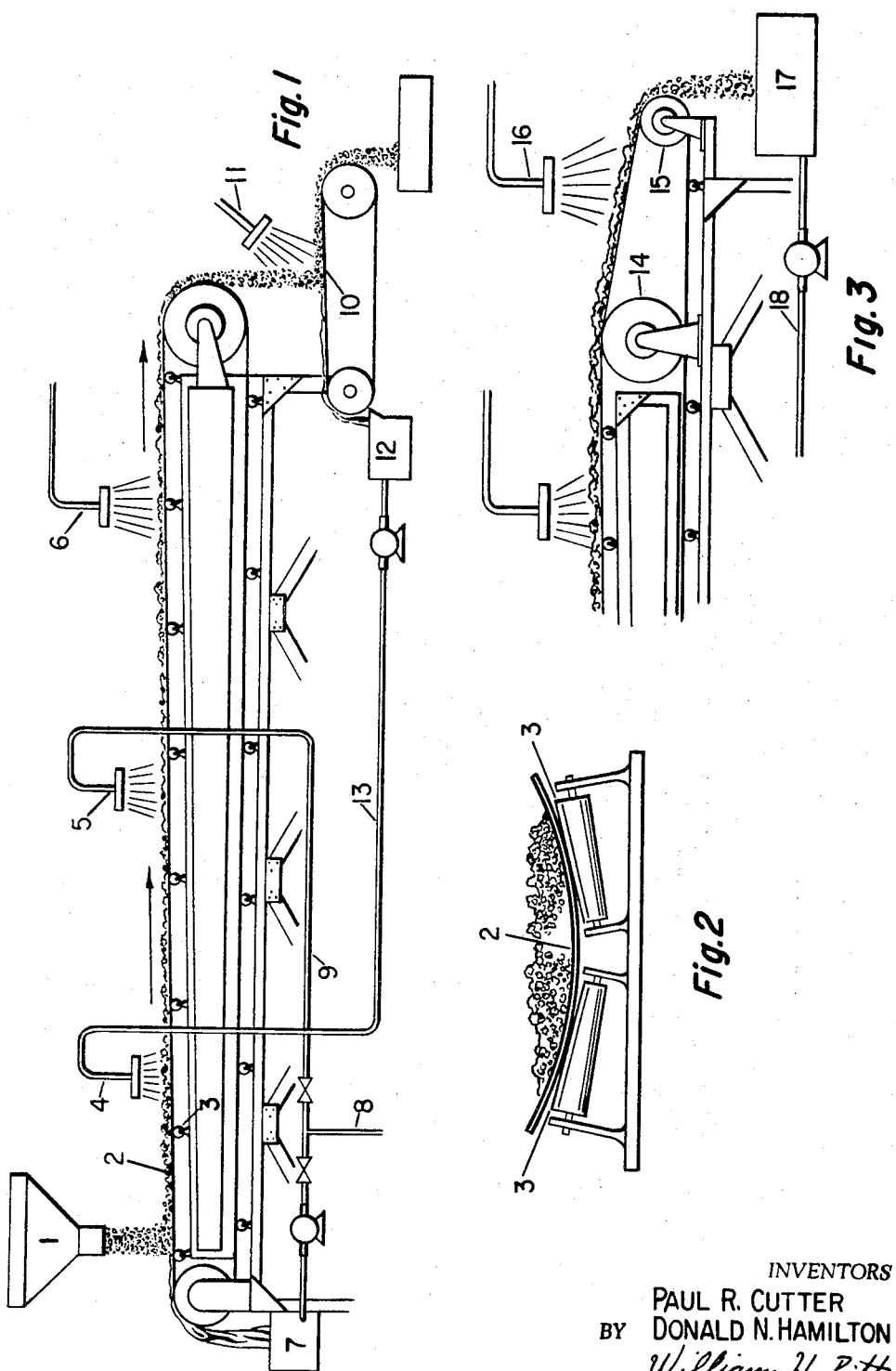

3,420,638
ACID LEACHING OF PHOSPHATE ROCK ON AN IMPERFORATE RUBBER BELT
Paul R. Cutter and Donald N. Hamilton, Painesville, Ohio, assignors to Diamond Shamrock Corporation, a corporation of Delaware
Filed Jan. 18, 1965, Ser. No. 426,013
U.S. Cl. 23—312          6 Claims
Int. Cl. C01b 25/22; B01d 11/02

ABSTRACT OF THE DISCLOSURE

A method is provided for the removal of values from minerals by the countercurrent contact of said minerals with a liquid wherein the minerals are introduced at the lower end of an upwardly moving conveyor and are contacted during their upward progress on said conveyor at a series of points with a liquid of progressively increasing concentration. Washing of the exhausted mineral to remove entrained liquid therefrom is also contemplated. The method is made more efficient by the optional recycle of liquid materials to the process.

This invention relates to methods for solid-liquid contact, and more particularly to an improved method for effecting countercurrent contact of minerals with dissolving or leaching liquids. Still more particularly, the invention is directed to an improved method for hydrochloric acid digestion of phosphate rock.

Calcium phosphate fertilizer and feed grade dicalcium phosphate are prepared from phosphate rock by digesting the rock with mineral acid to recover the phosphate content thereof as phosphoric acid, removing the fluorides and other impurities from the acid, and reacting the purified acid with a calcium compound such as lime. The acid digestion has typically been carried out in a series of large tank reactors, entailing transfer of the partially treated solids from one reactor to another. The product phosphoric acid must be separated from the spent solids before further processing, and the residual solids must be washed free of acid and disposed of. Because the spent sands resulting from digestion of unground phosphate rock cannot be removed by slurrying with water inasmuch as they are unfluidizable, it has been necessary to grind the rock to an average particle size of 100 mesh or less before digestion. Moreover, the initial reaction of concentrated mineral acid with phosphate rock in a conventional tank digester is extremely vigorous and releases a great deal of carbon dioxide with rapid foaming. Nevertheless, it is economically unfeasible to use weak acid for the initial reaction because of the necessity for removing the weak acid and introducing strong acid to complete the digestion.

A principal object of the present invention, therefore, is to provide an efficient method for solid-liquid countercurrent contact, and specifically for hydrochloric acid digestion of unground phosphate rock.

A further object is to provide a digestion method which essentially avoids the problem of foaming caused by the initial treatment of phosphate rock with strong acid but does not require additional manipulative steps.

A further object is to provide a digestion method which is suitable for continuous operation.

Other objects will in part be obvious and will in part appear hereinafter.

In its most general application as a method for the digestion or leaching of minerals to recover values therefrom, the present invention is directed to a method which comprises feeding the mineral preferably with a particle size of about 10–30 mesh, to the lower end of an upward-moving conveyor means; passing said mineral upward by said conveyor means in countercurrent contact with downward-moving leaching or dissolving liquid; recovering the spent mineral at the upper end of the conveyor and recovering the enriched liquid at the lower end thereof. More specifically and according to a preferred embodiment of the invention, the conveyor means consists of an endless belt on which the mineral moves upward in countercurrent contact with the leaching liquid. Still more specifically, the method of the present invention is adaptable for the digestion of phosphate rock by feeding unground rock, preferably with a particle size of about 10–30 mesh, onto the lower end of an upward-moving endless belt, passing said rock upward on said belt, contacting said rock with hydrochloric acid at a plurality of points, the acid introduced near the lower end of said belt being dilute and the acid introduced at points farther up said belt being progressively more concentrated; passing said hydrochloric acid in countercurrent contact with said rock on said belt, and recovering spent sand at the upper end of said belt and dilute phosphoric acid at the lower end thereof.

In the drawings, FIGURE 1 is a side view and FIGURE 2 an end view of a preferred apparatus by which the method of this invention may be practiced, and FIGURE 3 shows an alternative embodiment for final washing of the rock after digestion.

With references to FIGURES 1 and 2, 1 represents a hopper or a constant feed rate device from which phosphate rock of 10–30 mesh, preferably about 20 mesh, is fed onto rubber belt 2. This belt is constructed of neoprene or similar acid-resistant rubber and is supported on rollers 3 which are tilted so as to impart a concave surface to the belt. The belt is preferably about three to four feet wide and its length depends on the required contact time between acid and rock and the percolation rate of the liquor down the belt. A length of about 100 feet is adequate when the belt moves at a rate of about 100 feet per hour; this provides a one-hour contact time between rock and acid. The belt is inclined at a pitch of about one inch to every four feet of length (about 2%). The entire apparatus may be vented to a hood fitted with a suction fan (not shown) for the removal of fluosilicic acid vapors.

As the rock moves upward on the belt it is contacted with aqueous hydrochloric acid fed through spray nozzles 4, 5 and 6. In order to avoid excessive foaming, the acid furnished through nozzle 4 is a weak solution, typically containing about 5–10% HCl; it may also contain some phosphoric acid, particularly if it is recycled as described hereinafter. The partially digested rock then continues up the belt until it is contacted with about 10–20% hydrochloric acid through nozzle 5. Finally, nozzle 6 provides strong (about 30–35%) hydrochloric acid for the final stages of the digestion process.

It may be advantageous, particularly if the rock is smaller than 20 mesh in size, to add a non-ionic wetting agent to the acid with which the rock is treated. The wetting agent may comprise about 0.01–0.5% by weight of the acid.

The acid proceeds down the belt in countercurrent contact with the rock until it reaches the lower end and is collected in vessel 7. This acid is then removed through conduit 8 for further processing, including defluorination and liming operations. If desired, a line may serve to recycle part of the acid collected in receiver 7 for use as the medium-strength acid with which the phosphate rock is contacted through nozzle 5.

After the rock has been contacted with strong acid from nozzle 6, most of the phosphate content has been removed therefrom. The spent sands pass to the upper end of the belt and fall onto a second belt 10 which is inclined at a similar pitch. They are carried on this belt under nozzle 11 which furnishes water for washing the spent sands. The wash liquid, which is weakly acidic, is collected in vessel 12 and is preferably conducted through line 13 to spray nozzle 4, thereby furnishing the initial weak acid used for digestion of the rock. The washed solids pass over the upper end of belt 10 and are collected in a suitable vessel for disposal.

An alternative embodiment of the invention is shown in FIGURE 3. According to this embodiment, belt 2 passes over idler wheel 14 and is pitched downward to pulley 15. After the rock passes over idler wheel 14, it is contacted with water through nozzle 16. The wash liquid and spent sands are collected in receiver 17, which is preferably a perforated payloader bucket or similar apparatus from which liquid can be removed through line 18 and recycled through nozzle 4 and from which the solids may be discarded.

It will be seen that this invention provides a method whereby phosphate rock may be continuously digested with acid, without the necessity for troublesome transfer of solids from one vessel to another. Moreover, by contacting the rock first with dilute acid and allowing the acid to percolate downward countercurrently to the movement of the rock, foaming is largely eliminated.

Although the invention has been described with specific reference to digestion of phosphate rock, other applications will be readily apparent to those skilled in the art. For example, it may be used for aqueous extraction of sodium chromate from soda ash-roasted chrome ore, for sulfuric acid leaching of non-ferrous metals such as copper from ores, and the like.

It is to be understood that the invention is not limited by the specific examples and embodiments described hereinabove, but includes such changes and modifications as may be apparent to one skilled in the art upon reading the appended claims.

What is claimed is:

1. A method for the digestion of phosphate rock with hydrochloric acid which comprises feeding unground rock with a particle size of about 10–30 mesh onto the lower end of an upward-moving endless imperforate rubber belt, passing said rock upward on said belt, contacting said rock with hydrochloric acid at a plurality of points, the acid introduced near the lower end of said belt being about 5 to 10% by weight aqueous solution, the acid introduced at points farther up said belt being progressively more concentrated, the acid introduced at the upper end of said belt being 30 to 35% by weight aqueous solution; passing said hydrochloric acid in countercurrent contact with said rock on said belt, washing the spent sand with water and using the wash liquid as the acid introduced near the lower end of said belt, and recovering spent sand at the upper end of said belt and dilute phosphoric acid at the lower end thereof.

2. The method of claim 1 wherein the hydrochloric acid contains about 0.01–0.5% by weight of a non-ionic wetting agent.

3. The method of claim 1 wherein a portion of the dilute acid recovered as product is recycled for further use in the digestion process.

4. The method of claim 1 wherein the washing of the spent sand is accomplished by passing said spent sand onto a second upward-moving belt and contacting the same with water, and collecting the weakly acidic wash liquid at the lower end of said second belt.

5. The method of claim 1 wherein the washing of the spent sand is accomplished by passing said sand onto a downward-moving portion of the belt, contacting the same with water, and collecting said water and spent sand.

6. A method for the digestion of phosphate rock with hydrochloric acid which method comprises feeding unground rock with a particle size of about 10–30 mesh onto the lower end of an upward-moving endless imperforate rubber belt, passing said rock upward on said belt, contacting said rock with hydrochloric acid at a plurality of points, the acid introduced near the lower end of said belt being at least in part the dilute acid obtained upon washing spent sand from the upper end of the belt and having a concentration of 5 to 10% by weight aqueous solution, and the acid introduced at points further up said belt being progressively more concentrated, the acid introduced at an intermediate point up the belt being at least in part the dilute acid recovered at and recycled from the lower end of the belt, the acid introduced at the upper end of said belt being 30 to 35% by weight aqueous solution; passing said hydrochloric acid downward in countercurrent contact with said rock on said belt, water washing the spent sand at the upper end of said belt and recovering dilute phosphoric acid at the lower end of said belt.

References Cited

UNITED STATES PATENTS

| | | | |
|---|---|---|---|
| 656,695 | 8/1900 | Jacques | 23—270 X |
| 1,906,386 | 5/1933 | Liljenroth | 23—165 |
| 2,191,296 | 2/1940 | Kleine | 134—72 X |
| 2,233,956 | 3/1941 | Moore | 23—165 |
| 2,273,126 | 2/1942 | McGillin | 134—48 X |
| 2,630,377 | 3/1953 | Lewis | 23—270 |
| 2,955,919 | 10/1960 | Wilson | 23—165 |
| 3,000,391 | 9/1961 | Marshall | 134—48 X |
| 3,072,461 | 1/1963 | Long | 23—165 |
| 3,083,126 | 3/1963 | Griffiths | 134—25 |
| 3,192,014 | 6/1965 | Leyshon | 23—165 |

FOREIGN PATENTS 218,522  2/1910  Germany.

NORMAN YUDKOFF, *Primary Examiner.*

S. J. EMERY, *Assistant Examiner.*

U.S. Cl. X.R.

23—165, 270; 100—119; 134—131